United States Patent
El-Sherif et al.

(10) Patent No.: US 7,092,197 B2
(45) Date of Patent: Aug. 15, 2006

(54) REJECTION OF POWER SUPPLY VARIATIONS FOR GAIN ERROR CANCELLATION IN PULSE-WIDTH-MODULATED MOTOR CONTROLLERS

(75) Inventors: Alaa Y. El-Sherif, Plano, TX (US); Eugene F. Plutowski, Rochester, MN (US); Kevin W. Ziemer, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/881,486

(22) Filed: Jun. 30, 2004

(65) Prior Publication Data

US 2005/0264921 A1   Dec. 1, 2005

Related U.S. Application Data

(60) Provisional application No. 60/575,457, filed on May 28, 2004.

(51) Int. Cl.
*G11B 21/02* (2006.01)

(52) U.S. Cl. .................... 360/75; 360/77.02
(58) Field of Classification Search ............ 360/75
See application file for complete search history.

(56) References Cited

U.S. PATENT DOCUMENTS

| | | | |
|---|---|---|---|
| 4,449,059 A | 5/1984 | Dickes | |
| 4,514,727 A * | 4/1985 | Van Antwerp | 345/691 |
| 4,585,951 A | 4/1986 | Wurzburg | |
| 4,926,131 A | 5/1990 | Leydier | |
| 5,838,515 A | 11/1998 | Mortazavi et al. | |
| 6,374,043 B1 | 4/2002 | El-Sherif et al. | |
| 6,421,257 B1 * | 7/2002 | MacKay et al. | 363/41 |
| 2005/0017799 A1 * | 1/2005 | Risbo et al. | 330/10 |

* cited by examiner

*Primary Examiner*—Wayne Young
*Assistant Examiner*—Jason Olson
(74) *Attorney, Agent, or Firm*—W. James Brady; Frederick J. Telecky, Jr.

(57) ABSTRACT

A positioning driver (32) for a voice coil motor (22) in a disk drive system (10) is disclosed. Pulse-width-modulated prestage drivers (46) are coupled to power transistors (50) arranged in an "H" bridge for driving the voice coil motor (22), biased with a power supply voltage ($V_M$). The pulse-width-modulated prestage drivers (46) drive the power transistors (50) according to a comparison between an error signal from an error amplifier (36) and a ramp clock signal (RMP) generated by a ramp clock generator (46). The ramp clock generator (46) includes a control circuit (68) that modulates the high and low limits of the ramp clock signal (RMP) in response to variations in the power supply voltage ($V_M$). This modulation of the high and low limits compensates for variations in the gain of the power transistors (50) resulting from variations in the power supply voltage ($V_M$). The control circuit (68) may also modulate the slope of the ramp clock signal (RMP) according to variations in the power supply voltage ($V_M$), for example to maintain a constant frequency.

17 Claims, 4 Drawing Sheets

REJECTION OF POWER SUPPLY VARIATIONS FOR GAIN ERROR CANCELLATION IN PULSE-WIDTH-MODULATED MOTOR CONTROLLERS

CROSS-REFERENCE TO RELATED APPLICATIONS

This application claims priority, under 35 U.S.C. §119(e), of Provisional Application No. 60/575,457, filed May 28, 2004.

STATEMENT REGARDING FEDERALLY SPONSORED RESEARCH OR DEVELOPMENT

Not applicable.

BACKGROUND OF THE INVENTION

This invention is in the field of motor control, and is more specifically directed to control of voice coil motors as used in computer disk drive controllers.

As is evident in the industry, the magnetic disk drive remains the dominant technology for mass read/write storage in modem computers, including both desktop workstations and also portable "laptop" computers. Magnetic disk drives are now also popular in smaller scale portable systems, such as portable audio systems and players.

Modern disk drives typically include a "spindle" motor and a "voice coil" motor. The spindle motor spins the magnetic disks during operation, so that sectors at a given radius of the disk pass by the data transducer, or read/write "head". The voice coil motor positions the data transducer at the radial positions of the magnetic disk surface that correspond to the track locations to which data are being written or from which data are being read. Typically, the data transducer is at the end of a positioning arm that pivots across the surface of the spinning magnetic disk, from a pivot point outside of the circumference of the magnetic disk, so that pivoting of the positioning arm changes the radial position of the data transducer over the magnetic disk surface. The voice coil motor controls the pivoting of the positioning arm, and thus the track location of the data transducer.

Voice coil motor controller circuitry generally provides drive signals to the voice coil motor through a pair of output drivers, typically including high-side and low-side drivers connected on opposite sides of the voice coil motor. In operation, the positioning arm is pivoted in one direction by the high side driver sourcing current through the voice coil motor to the low side driver, and pivoted in the opposite direction by the low side driver source current through the voice coil motor to the high side driver.

By way of further background, U.S. Pat. No. 5,838,515 describes a dual mode voice coil motor driver that operates in a pulse-width-modulated ("Class D") mode and also in a linear mode. As well known in the art, the "track following" operating mode of the voice coil motor maintains the data transducer at a desired track location, and the "track seek" operating mode moves the positioning arm from one track location to another. This reference describes that the voice coil motor operates in a pulse-width-modulated mode during track seek, but is placed into the linear mode at the onset of a deceleration phase of the seek trajectory, staying in linear mode during track following.

Referring now to FIG. 1, a conventional pulse-width-modulated voice coil motor driver is illustrated. In this example, a differential error signal is received on lines ERRP, ERRM. Input line ERRP is applied to the non-inverting input of comparator 3H, and input line ERRM is applied to the non-inverting input of comparator 3L. The differential error signal on lines ERRP, ERRM is generally developed by an error amplifier (not shown) that compares a feedback signal with a desired input level. Ramp clock generator 2 generates a triangle wave signal, at a frequency corresponding to that of the desired pulse-width-modulated (PWM) output signal, and applies this ramp clock signal to the inverting inputs of comparators 3H, 3L. The output of comparator 3H is applied to the input of differential PWM output amplifier 4H, and the output of comparator 3L is connected to the input of differential PWM output amplifier 4L. Differential PWM output amplifier 4H generates output levels that are applied to the gates of power transistors 5PH, 5PL, and that define a differential voltage gP; similarly, differential PWM output amplifier 4L generates output levels that are applied to the gates of power transistors 5NH, 5NL, at a differential voltage gM.

Power transistors 5 are arranged in the conventional "H" bridge, as known in the art for powering voice coil motor (VCM) 9. In this arrangement, power transistors 5PH, 5PL have their source-drain paths connected in series between power supply voltage $V_M$ and ground, as do power transistors 5NH, 5NL. VCM 9 is connected between node VCMP at the drain of transistor 5PL and the source of transistor 5PH (transistors 5PL, 5PH each being n-channel devices in this example), and node VCMN at the drain of transistor 5NL and the source of transistor 5NH. Accordingly, the relative voltages at nodes VCMP, VCMN determine the polarity and magnitude of current conducted through VCM 9.

The operation of the conventional arrangement of FIG. 1 will now be described relative to FIG. 2. As evident from FIG. 2, the relationship between the signals on input error lines ERRP, ERRM, on one hand, and the output signal RMP from ramp clock generator 2, on the other hand, determines the current through VCM 9. As shown in FIG. 2, differential voltage gP from PWM output amplifier 4H is positive in response to the voltage on line ERRP being higher than the instantaneous voltage of ramp clock RMP, and is negative when line ERRP is at a lower voltage than that of ramp clock RMP. In this example, referring back to FIG. 1, a positive differential voltage gP turns on transistor 5PH relative to transistor 5PL, which pulls the voltage at node VCMP toward power supply voltage VM. Similarly, differential voltage gM from PWM output amplifier 4L is positive in response to the voltage on line ERRM being lower than the instantaneous voltage of ramp clock RMP, and is negative when line ERRM is at a higher voltage than that of ramp clock RMP. A positive differential voltage gM turns on transistor 5NL relative to transistor 5NH, which pulls the voltage at node VCMN toward ground.

In general, current is conducted between nodes VCMA, VCMB and through VCM 9 when the voltages at nodes VCMP, VCMN differ from one another. In FIG. 2, current pulses T0 through T3 illustrate positive polarity currents conducted through VCM 9, corresponding to those times at which both of differential voltages gP, gM are of positive polarity, and current pulses T4 and T5 illustrate negative polarity currents through VCM 9, corresponding to both of differential voltages gP, gM being negative polarity. In this example, positive polarity current pulses such as those in pulses T0 through T3 result from the situation in which the voltage at input line ERRP is above reference voltage Vref while the voltage at input line ERRM is below reference voltage Vref. Conversely, during those times at which input line ERRP is at a voltage lower than that of waveform RMP in combination with input line ERRM also at a voltage lower than that of waveform RMP, a current is conducted through VCM 9 in the opposite direction, as shown by current pulses T4, T5 and the corresponding differential voltages gP, gM. In the example of FIG. 2, this negative current drive is the result of the voltage of input line ERRP falling below reference voltage Vref and the voltage of input line ERRM rising above reference voltage Vref. During those times at which the differential voltages gP, gM are of opposite polarity, the voltages at nodes VCMP, VCMN are effectively equal to one another, and no current is conducted.

It has been observed, in connection with this invention, that variations in power supply voltage affect the transconductance, or open-loop, gain of the conventional PWM VCM drive circuit of FIG. 1, and will therefore affect the current driven through VCM 9. It is apparent from FIG. 1 that the current through power transistors 5 of the "H" bridge arrangement will depend directly on the power supply voltage $V_M$; obviously, a higher power supply voltage $V_M$ will result in higher drain currents, and thus higher currents through VCM 9, for a given fixed duty cycle.

Referring to FIG. 2, one can consider reference voltage Vref as a "pseudo-ground" for purposes of considering the gain of the drive circuit. If the error voltages at lines ERRP, ERRM are both at reference voltage Vref, no current will be driven; this is the 0% duty cycle voltage. If the error voltages at lines ERRP, ERRM are at respective peak voltages of ramp clock RMP, current will be constantly driven through VCM 9. For example, if the error voltage at line ERRP is at the positive peak voltage while the error voltage at line ERRM is at the negative peak level, positive current will be driven through VCM 9 at a 100% duty cycle. Conversely, if the error voltage at line ERRP is at the negative peak voltage while the error voltage at line ERRM is at the positive peak level, negative current will be driven through VCM 9, also at a 100% duty cycle.

The effect of power supply variations can be considered by way of an example, in which power supply voltage $V_M$ is 12 volts, the open-loop gain of drive stage is nominally 12, and with reference voltage $V_{ref}$ at ground. Accordingly, the center-to-peak voltage $V_{peak}$ of the ramp clock RMP, at which 100% duty cycle is obtained, can be considered from:

$$V_{peak} = \frac{V_M}{\text{gain}} = \frac{12}{12} = 1 \text{ volt} \quad (1)$$

Because VCM 9 is a bidirectional motor, the peak-to-peak voltage ramp of ramp clock RMP in this situation will be 2 volts. But power supply voltage $V_M$ can vary from 10.8 to 13.2 volts, if a ±10% power supply voltage tolerance is specified. Maintaining the center-to-peak voltage $V_{peak}$ at 1 volt over this ±10% variation in power supply voltage $V_M$, the drive circuit open-loop gain will correspondingly varies from 10.8 to 13.2. Variations in the power supply voltage $V_M$ thus cause corresponding variations in the open-loop gain.

The effect of these variations in open-loop gain are most evident in dual-mode voice coil motor driver circuits, such as described in U.S. Pat. No. 6,374,043, issued Apr. 16, 2002, assigned to Texas Instruments Incorporated and incorporated herein by this reference. In the linear mode, feedback control of the VCM drive will eliminate variations in the drive of power transistors 5. In addition, many class D or pulse-width-modulated voice coil motor drive systems or modes also include feedback control, that will compensate for variations in open-loop gain during steady-state operation in that mode. However, dual-mode voice coil motor driver circuits, such as described in U.S. Pat. No. 6,374,043, make transitions from the linear mode to the PWM mode. When making a transition, the open-loop gain of the drive circuit will dominate the drive of the voice coil motor until such time as the feedback control loop can respond to the resulting error. Accordingly, variations in open-loop gain, for example of the "H" bridge of power transistors 5 in FIG. 1, can be quite evident in transitions between drive modes.

In addition, some conventional disk drive systems do not use electrical feedback for control of the position of the data transducers, and thus for control of the voice coil motor, but instead use a mechanical positioning device for such control. In these conventional systems, variations in the open-loop gain of the voice coil motor drive circuit will directly affect the positioning of the data transducers. It is believed that these gain variations will lengthen the track settling times, and in severe cases may cause positioning errors.

BRIEF SUMMARY OF THE INVENTION

It is therefore an object of this invention to provide a pulse-width-modulated class D drive circuit in which variations in power supply voltages are compensated.

It is a further object of this invention to provide such a drive circuit in which variations in the open-loop gain due to power supply voltage variations are compensated.

It is a further object of this invention to provide such a drive circuit in which variations in the power supply voltage does not result in variations in the PWM output frequency.

It is a further object of this invention to provide a disk drive system including such a drive circuit for controlling the drive to a voice coil motor that positions the data transducer at selected disk tracks.

Other objects and advantages of this invention will be apparent to those of ordinary skill in the art having reference to the following specification together with its drawings.

The present invention may be implemented into a drive circuit, such as useful for driving a voice coil motor that positions the data transducer, or read/write head, in a disk drive. A ramp clock generator generates a waveform against which an error signal is compared, for purposes of generating a pulse-width-modulated output drive signal. The ramp clock generator includes a control circuit that is responsive to the power supply voltage of the output drive circuit, so that the voltage limits of the ramp clock, or the waveform slope, or both, are modulated in response to variations in the power supply voltage.

DETAILED DESCRIPTION OF THE INVENTION

The present invention will be described in connection with its preferred embodiment, namely as implemented into a drive circuit for a voice coil motor in a modem computer disk drive system, because the advantages provided by this invention are contemplated to be especially beneficial in such an application. However, it is also contemplated that this invention may be used to advantage in other applications, and that such uses will be apparent to those skilled in the art having reference to this specification. Accordingly, it is to be understood that the following description is provided by way of example only, and is not intended to limit the true scope of this invention as claimed.

Figure 1:
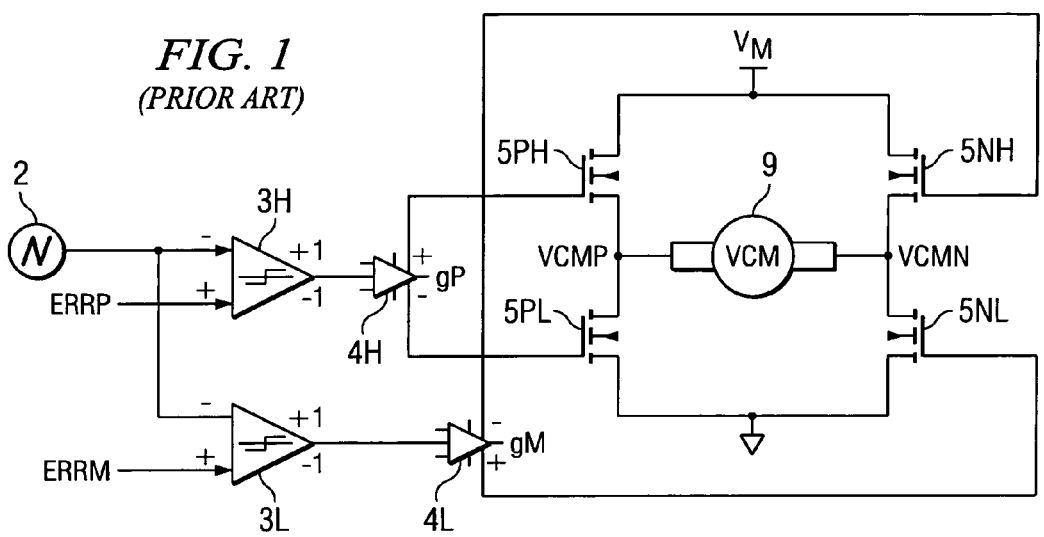
FIG. 1 is an electrical diagram, in schematic form, of a conventional pulse-width-modulated drive circuit for a voice coil motor.
Figure 3:
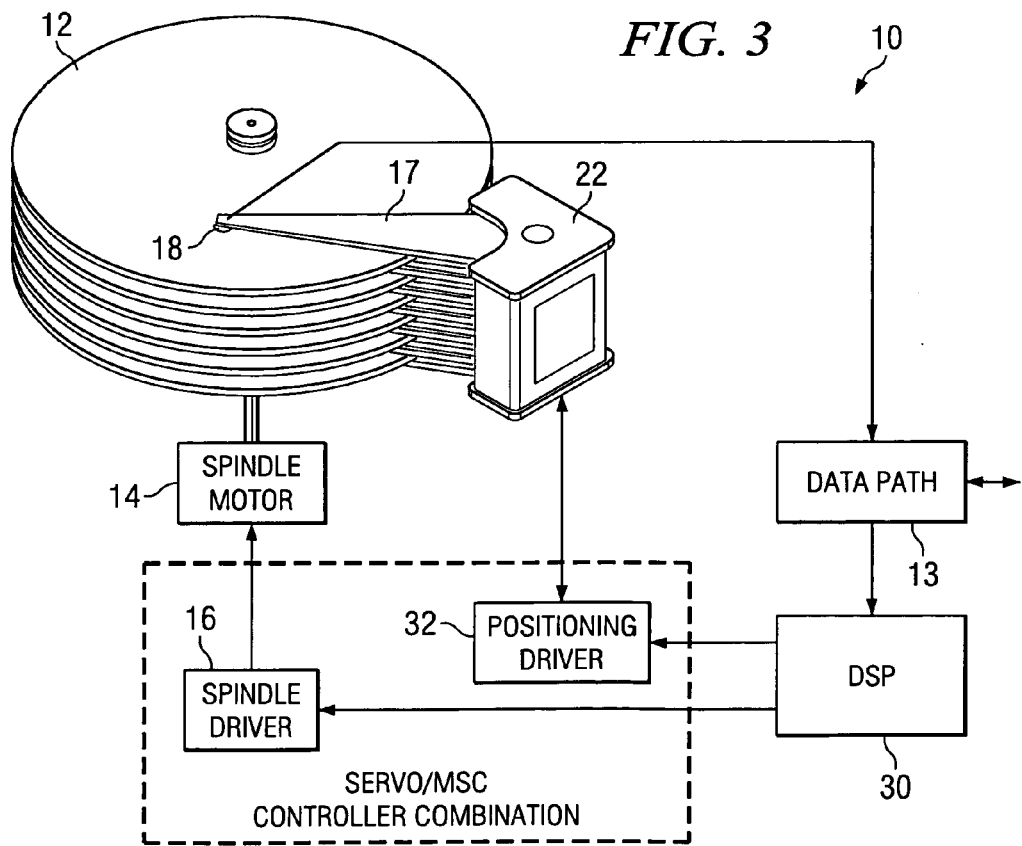
FIG. 3 is an electrical diagram, in block form, of a disk drive system constructed according to the preferred embodiment of the invention.
Figure 2:
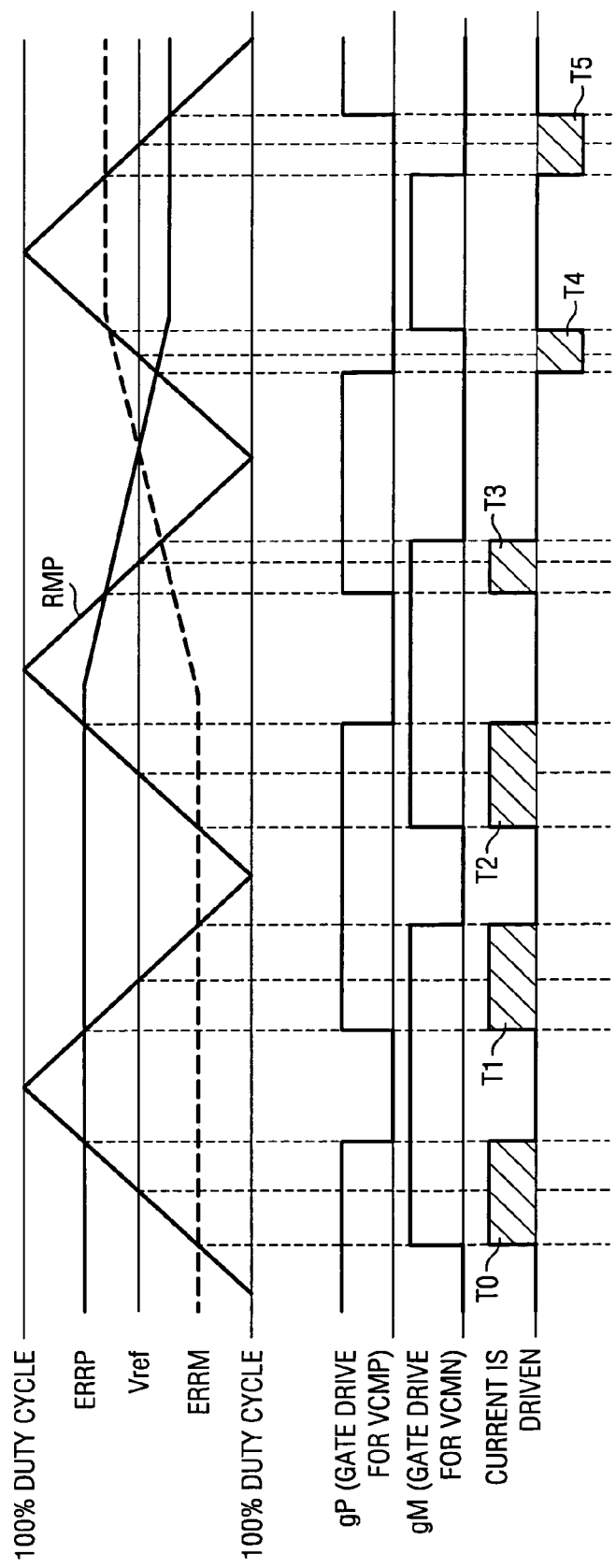
FIG. 2 is a timing diagram illustrating the operation of the conventional pulse-width-modulated drive circuit of FIG. 1.

FIG. 3 generically illustrates disk drive system 10 constructed according to the preferred embodiment of the invention. Disk drive system 10 includes one or more magnetic media disks 12 that are rotated by spindle motor 14 in response to spindle driver circuit 16. Data transducer 18 is the read/write head of disk drive system 10, and is disposed at the end of positioning arm 17. In the multiple disk case shown in FIG. 1, multiple positioning arms 17 are provided, each having one or more data transducers 18. Voice coil motor (VCM) 22 operates to pivot positioning arm 17 to locate data transducer 18 at selectable radial tracks of disk 12. These radial tracks of disk 12 are contain track identification data, location information, and synchronization data that are used for operation of disk drive system 10. Data transducer 18 is used both to record ("write") user data to and read user data back from the disk, to detect signals that identify the tracks and sectors at which data are written, and to detect servo bursts that enable the head to be properly laterally aligned with the tracks of the disk.

Analog electrical signals that are generated by the head 18 in response to the magnetic signals recorded on disk 12 are forwarded to data path 13 for eventual communication to and from the host computer system (not shown). Servo signals that are prerecorded on the disk 12, in either digital or analog form, are detected and demodulated by one or more servo demodulator circuits (not shown) and processed by a digital signal processor (DSP) 30 to control the position of the data transducer 18 via positioning driver circuit 32. Positioning driver circuit 32 may be embodied within a common microcontroller with spindle driver circuit 16, which controls spindle motor 14. Positioning driver circuit 32 may also be integrated with other circuitry within disk drive system 10 as desired.

Figure 4:
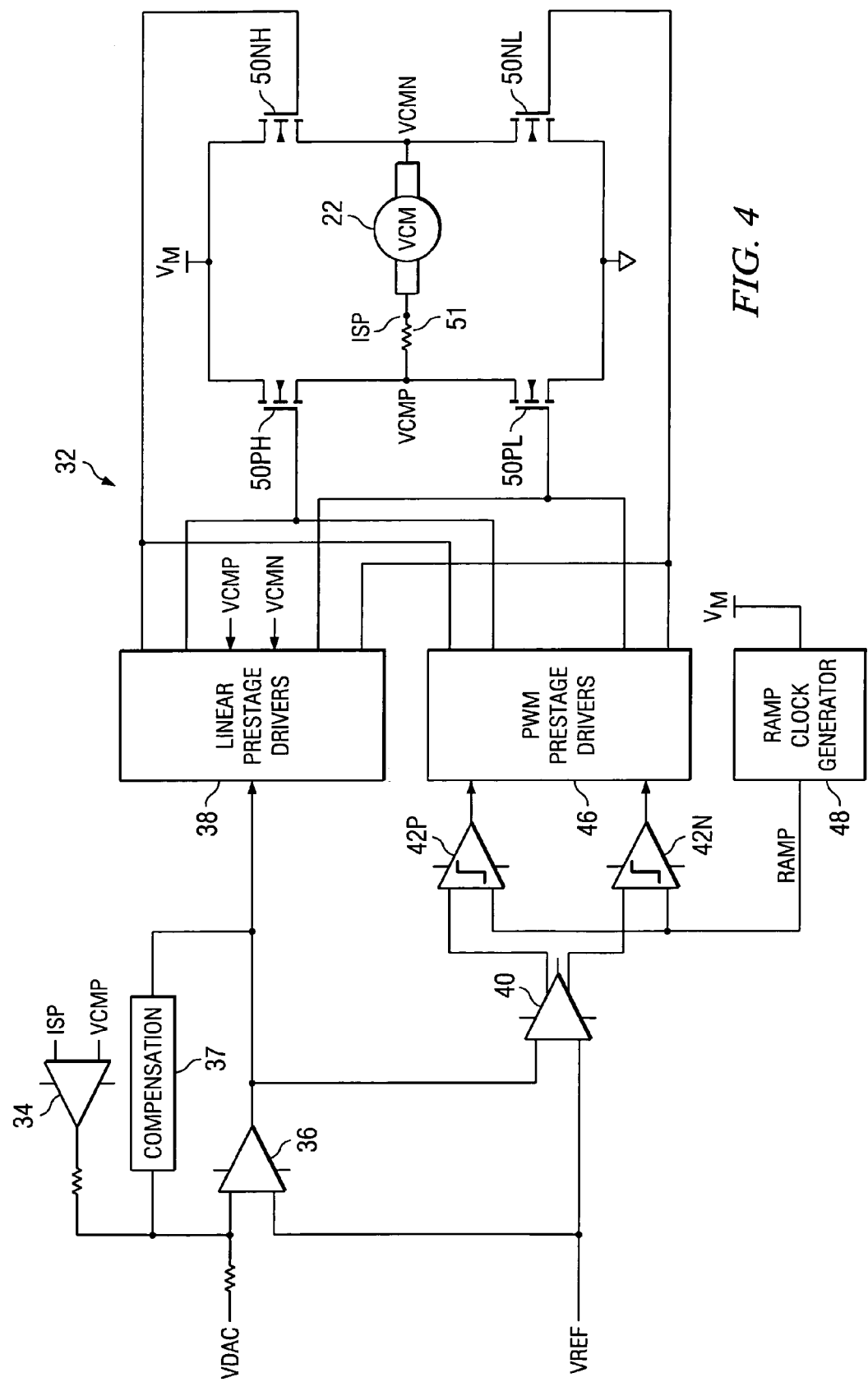
FIG. 4 is an electrical diagram, in block and schematic form, of the voice coil motor drive circuit in the system of FIG. 3, constructed according to the preferred embodiment of the invention.

Referring now to FIG. 4, the construction of positioning driver circuit 32, in combination with voice coil motor (VCM) 22 itself, according to the preferred embodiment of the invention will now be described. As will be evident from this description, positioning driver circuit 32 is dual-mode, in that it includes both linear and pulse-width-modulated (or class-D) driver modes.

Power transistors 50 are arranged in the conventional "H" bridge for driving current through VCM 22. The "high" side drive is provided by transistors 50PH, 50PL, which are both n-channel power metal-oxide-semiconductor (MOS) transistors in this embodiment of the invention; as well known in the art, complementary MOS (CMOS) technology may also be used, if desired, for driving VCM 22, in which case transistor 50PH would be a p-channel MOS transistor. The source-drain paths of high side transistors 50PH, 50PL are connected in series between power supply voltage VM and ground. Similarly, the "low" side drive is provided by transistors 50NH, 50NL, which also have their source-drain paths connected in series between power supply voltage $V_M$ and ground. Voice coil motor 22 is connected between node VCMP at the source of transistor 50PH and the drain of transistor 50PL, and node VCMN at the source of transistor 50NH and the drain of transistor 50NL. The voltages at nodes VCMP, VCMN are commonly referred to in the art as the "phase" voltages. Current sense resistor 51 is connected in series with VCM 22, with sense node ISP between resistor 51 and VCM 22.

In general, as well known in the art, the relative drive applied to the gates of transistors 50 determines the current polarity and magnitude through VCM 22. For example, if the gates of high side drive transistors 50PH, 50PL are biased so that transistor 50PH is turned on relatively hard as compared to transistor 50PL, with the gates of low side drive transistors 50NH, 50NL biased so that transistor 50NL is turned on relatively hard relative to transistor 50NH, the phase voltage at node VCMP will be higher than the phase voltage at node VCMN. This will result in a current sourced through transistor 50PH, conducted through VCM 22, and sunk through transistor 50NL, which will cause VCM 22 to pivot positioning arm 17 in one direction. Conversely, if the gates of high side drive transistors 50PH, 50PL are biased so that transistor 50PL is turned on relatively hard as compared to transistor 50PH, with the gates of low side drive transistors 50NH, 50NL biased so that transistor 50NH is turned on relatively hard relative to transistor 50NL, the phase voltage at node VCMN will be higher than the phase voltage at node VCMP. This will result in a current sourced through transistor 50NH, conducted through VCM 22, and sunk through transistor 50PL, which will cause VCM 22 to pivot positioning arm 17 in an opposite direction.

Accordingly, the voltages applied to the gates of transistors 50 control the polarity and magnitude of current conducted through VCM 22. It is this function that positioning driver circuit 32 accomplishes in disk drive system 10 of FIG. 3.

Referring again to FIG. 4, on the linear side of positioning driver circuit 32, current sense amplifier 34 receives the voltages at nodes VCMP and ISP at its inputs, and produces a signal corresponding to the voltage drop across resistor 51, and thus corresponding to the current through VCM 22. This signal is summed with a control voltage VDAC at an input of error amplifier 36; the other input of error amplifier 36 receives a reference voltage VREF. Error amplifier 36 includes compensation feedback network 37 connected between its output and input, for stability of operation as known in the art. The output of error amplifier 36 is an error signal corresponding to the difference between the desired voltage VDAC summed with a voltage corresponding to the instantaneous current level through VCM 22, relative to the reference voltage VREF. This error signal is applied to linear prestage drivers 38, along with feedback signals corresponding to the phase voltages at nodes VCMP, VCMN. In response to the error signal and the phase voltages, linear prestage drivers 38 drive the gates of bridge transistors 50PH, 50PL, 50NH, 50NL with voltages that define the current through VCM 22, in turn controlling the motion of positioning arm 17 and transducer 18 (FIG. 1) in seeking or following a desired track location on disk 12.

Additional detail regarding the construction and operation of linear prestage drivers 38, as may be used in connection with this invention, is provided in U.S. Pat. No. 6,374,043, commonly assigned with this application and incorporated herein by this reference. It is also contemplated that other architectures of linear drivers for voice coil motor 22 may alternatively be used in connection with this invention.

On the PWM side of positioning driver circuit 32, the error signal from error amplifier 36 is forwarded to one input of differential amplifier 40; the second input of differential amplifier 40 receives the reference voltage Vref. Differential amplifier 40 generates a differential output signal corresponding to the difference between the error signal from error amplifier 36 and the reference voltage Vref. One output of differential amplifier 40 is applied to an input of comparator 42P, while the other output of differential amplifier 40 is applied to an input of comparator 42N. Each of comparators 42P, 42N compare these inputs to ramp clock signal RAMP, which is generated by ramp clock generator 48. As will be described in detail below, ramp clock signal RAMP is generated by ramp clock generator 48 in a manner that depends on the power supply voltage $V_M$. Each of comparators 42P, 42N generate full-rail output signals responsive to the comparison between its input received from differential amplifier 40 and ramp clock signal RAMP, and provide the resulting logic levels to PWM prestage drivers 46, which in turn generate the drive signals that are applied to the gates of transistors 50. The operation of power transistors 50 in the "H" bridge of FIG. 4 corresponds to that described above relative to FIG. 1. In that manner, transistors 50 in the "H" bridge produce pulse-width-modulated current that is applied to VCM 22, and that control its pivoting and motion.

Figure 5:
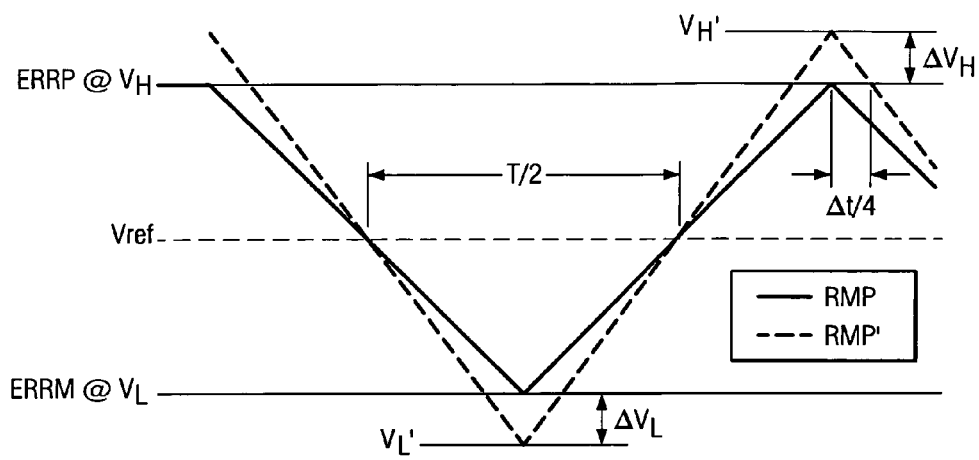
FIG. 5 is a timing diagram illustrating the theory of operation of the preferred embodiment of the invention.

Referring now to FIG. 5, the theory of operation of this invention will now be described. Ramp clock signal RMP is the nominal ramp clock signal, and as such is a triangle waveform having a maximum level $V_H$ and a minimum level $V_L$. Alternatively, ramp clock signal RMP may be a sawtooth waveform, or another time-varying waveform as useful in generating a pulse-width-modulated output signal; while this description will refer to a triangle waveform, it is to be understood that this invention may similarly be applied to such other waveform shapes. In this example, in which pseudo-voltage Vref is actually at ground, or 0 volts, ramp clock signal RMP has positive and negative polarity excursions, with voltage $V_H=-V_L$. The 100% duty cycle error voltages ERRP, ERRM are illustrated in FIG. 5, at voltages $V_H$, $V_L$, respectively. The period of ramp clock signal RMP is time T in this example.

As mentioned above, the open-loop gain of positioning driver 32, primarily at the "H" bridge of power transistors 50, will vary as power supply voltage $V_M$ varies. It has been discovered, according to this invention, that one can compensate for this gain variation by changing the peak amplitudes $V_{peak}$ of the ramp clock signal as a function of power supply voltage $V_M$, following equation (1). This will cause a change in the duty cycle of the output PWM signal that compensates for the change in open-loop gain resulting from the variation in the power supply voltage. For example, if the power supply voltage $V_M$ increases from its nominal value, the peak amplitudes $V_{peak}$ are also increased, which results in a decrease in the duty cycle of the output PWM signal. Conversely, a reduction in the power supply voltage $V_M$ is compensated by a decrease in peak amplitudes $V_{peak}$ of the ramp clock signal, which will be reflected in an increase in the PWM duty cycle that compensates for the reduced open-loop gain.

It has been further discovered that, as the amplitude of the ramp clock is changed to ramp clock signal RMP', the frequency of ramp clock signal RMP' will also change unless the current sources used to create the integration current in the ramp clock circuit are corrected. In many applications, this frequency is preferably corrected because the ramp clock frequency directly controls the overall PWM frequency at the output. However, full or partial correction of the ramp clock frequency is optional, according to the preferred embodiment of the invention.

In the example of FIG. 5, ramp clock signal RMP' corresponds to a ramp clock signal that, according to the preferred embodiment of the invention, is compensated for an increase in the power supply voltage $V_M$. In this example, the frequency of compensated ramp clock signal RMP' is also adjusted to match that of nominal ramp clock signal RMP, as will be described below. Compensated ramp clock signal RMP' makes excursions from a maximum voltage $V_H'=V_H+\Delta V_H$ to a minimum voltage $V_L'=V_L+\Delta V_L$, at the same frequency as ramp clock signal RMP. The relationship among the voltages $\Delta V_H$, $\Delta V_L$ and the variation $\Delta V_M$ of power supply voltage $V_M$ can be stated as:

$$\frac{\Delta V_H}{V_H} = \frac{\Delta V_L}{V_L} = \frac{\Delta V_M}{V_M} \qquad (2)$$

As evident from FIG. 5, in order to maintain the same frequency for compensated ramp dock signal RMP' as ramp clock signal RMP, the slope of compensated ramp dock signal RMP' is changed from that of nominal ramp clock signal RMP, to a new slope m' of:

$$m' = \frac{V_H'}{(T/4)} = \frac{4(V_H + \Delta V_H)}{T} \qquad (3)$$

This compensation will cause the PWM duty cycle to be decreased by an amount corresponding to the time $\Delta t$ that compensated ramp clock signal RMP' is above the error voltage ERRP or below error voltage ERRM (as compared to the full duty cycle resulting from nominal ramp clock signal RMP in this example). The change in duty cycle (expressed as a fraction of the overall period T) is:

$$\frac{\Delta t}{T} = \frac{4\Delta V_H'}{m'T} \qquad (4)$$

One can express this change in the duty cycle by substituting equation (2) into equation (3) to yield:

$$\frac{\Delta t}{T} = \frac{\Delta V_H}{V_H + \Delta V_H} = \frac{1}{\left(1 + \frac{V_H}{\Delta V_H}\right)} \qquad (5)$$

which, considering equation (2), can be expressed in terms of the change in the power supply voltage $V_M$:

$$\frac{\Delta t}{T} = \frac{1}{\left(1 + \frac{V_M}{\Delta V_M}\right)} \qquad (6)$$

It is this change in duty cycle that compensates for the change in open-loop gain resulting from the power supply voltage variations.

In order to maintain the frequency constant, as shown in the example of FIG. 5, the change in the slope m' of ramp clock signal RMP' relative to the slope m of nominal ramp clock signal RMP becomes:

$$\frac{m'}{m} = \frac{V'_H / \frac{T}{4}}{V_H / \frac{T}{4}} = \frac{V'_H}{V_H} = 1 + \frac{V_H}{\Delta V_H} \qquad (7)$$

or:

$$\frac{m'}{m} = 1 + \frac{\Delta V_M}{V_M} \qquad (8)$$

These slopes m, m' correspond to the charging and discharging rates in conventional ramp generators. For example, one type of ramp generator is based on the charging and discharging of a capacitor, which of course corresponds to:

$$i = C \frac{dV}{dt} = C \cdot m \qquad (9)$$

As a result, in order to change the slope from m to m', one must change the charging current (and discharging current) applied to the capacitor in the ramp generator:

$$\frac{i'}{i} = \frac{m'}{m} = \frac{1 + \Delta V_m}{V_M} \qquad (10)$$

so that the difference Δi=i'−i in charging and discharging current corresponds to the difference in power supply voltage:

$$\frac{\Delta i}{i} = \frac{\Delta V_M}{V_M} \qquad (11)$$

As mentioned above, by modulating the charging and discharging current in the ramp generator according to variations in the power supply voltage, the frequency of the ramp clock signal can be maintained constant while still compensating for the change in open loop gain.

As known in the art, other types of ramp generator circuits are also known in the art. For example, another type of ramp generator circuit involves an integrator, generating an output signal corresponding to the integral of a step function pulse. The rate of integration is typically established by a feedback capacitor in an operational amplifier circuit. Accordingly, it will be appreciated by those skilled in the art that the slope of the output ramp signal from such a ramp generator circuit can be modulated by changing the capacitance value in response to variations in the power supply voltage. It is contemplated that those skilled in the art having reference to this specification will be readily able to effect modulation of the slope of the ramp signal in these, and still other, alternative ramp generator circuits, in order to maintain the PWM frequency constant.

As mentioned above, it may be acceptable, in some applications, to permit the frequency of the ramp clock signal to modulate along with changes in the power supply voltage, so long as the duty cycle is modulated to compensate for the corresponding changes in the open-loop gain. Still further in the alternative, it is contemplated that the slope of the ramp clock signal may be partially corrected, reducing the change in frequency, if desired. The extent to which the frequency is allowed to modulate with changes in the duty cycle can be implemented as desired by the designer, depending upon the particular application of the preferred embodiment of the invention.

In each case, the compensation in the PWM duty cycle, and in the slope of the ramp clock signal, may be applied upon power-up of the disk drive system, relative to nominal values corresponding to the nominal power supply voltage $V_M$. Preferably, real-time monitoring or measuring of the power supply voltage $V_M$ is also carried out, so that the PWM duty cycle and the slope of the ramp clock signal RMP can be adjusted during operation.

Figure 6:
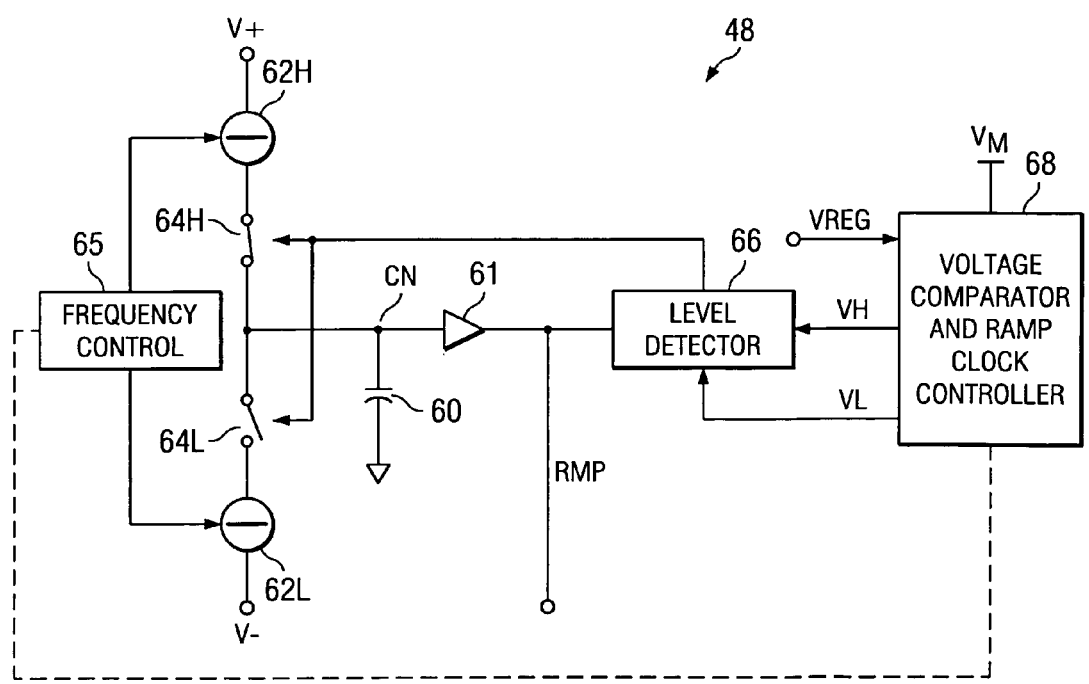
FIG. 6 is an electrical diagram illustrating the construction of a ramp clock generator in the voice coil motor drive circuit of FIG. 4, constructed according to the preferred embodiment of the invention.

According to the preferred embodiment of the invention, therefore, the duty cycle of the PWM operation is reduced in order to compensate for variations in the open-loop gain that result from variations in the power supply voltage applied to power transistors 50 in the "H" bridge output drive circuitry. Referring now to FIG. 6, the construction of ramp generator 48 according to the preferred embodiment of the invention will now be described in detail. This particular example of ramp generator 48 is based on the charging and discharging of a timing capacitor, and will be described as such. It is contemplated that those skilled in the art having reference to this specification will be readily able to apply this invention, in an analogous fashion, to other types of ramp generator circuits, considering that every ramp generator circuit necessarily includes a component or other parameter that controls the voltage limits of the ramp clock signal, and that controls its slope and thus its frequency.

As shown in FIG. 6, timing capacitor 60 has one plate connected to charging node CN, and its opposite plate at ground. Current source 62H and current source 62L are connected in series between bias voltage V+ and bias voltage V−, considering that the voltage excursions of output ramp clock signal RMP will be of both positive and negative polarity. In this series connection, switch 64H is connected in series between current source 62H and charging node CN, and switch 64L is connected in series between charging node CN and current source 62L. Switches 64L, 64H are controlled by level detector 66, as will be described below.

Buffer 61 has its input connected to charging node CN, and its output applied as ramp clock signal RMP and also forwarded to level detector 66. Level detector 66 receives signals on lines VH, VL indicating the high and low voltage limits of ramp clock signal RMP. Level detector 66 compares the instantaneous voltage of ramp clock signal RMP against the high and low voltage limits corresponding to the signals on lines VH, VL, and controls the state of switches 64H, 64L accordingly. In operation, switch 64H is closed and switch 64L is open (as shown in the example of FIG. 6) to charge capacitor 60. Once the voltage appearing at the output of buffer 61 from charging node CN reaches the high voltage limit corresponding to the signal on line VH, level detector 66 opens switch 64H and closes switch 64L to begin the discharge half-cycle. Capacitor 60 will then discharge through current source 62L until the voltage at the output of buffer 61 from charging node CN reaches the low voltage limit corresponding to the signal on line VL, in response to which the charging half-cycle repeats with the opening of switch 64L and the closing of switch 64H by level detector 66. The charging and discharging half-cycles continue in this manner.

As evident from this description, the frequency of the charging and discharging half-cycles depends on the current of current sources 62H, 62L. In this embodiment of the invention, frequency control circuit 65 generates control signals to current sources 62H, 62L to control these charging and discharging currents. As known in the art, current sources 62H, 62L can be implemented as MOS transistors, in which case frequency control circuit 65 will apply the appropriate gate voltages to set these current levels. Typically, at least the nominal frequency at which ramp generator 48 operates is determined either by design or under user control.

According to the preferred embodiment of the invention, the high and low voltage limits communicated to level detector 66 on lines VH, VL are modulated in response to variations in power supply voltage $V_M$, in the manner described above relative to FIG. 5. Ramp generator 48, in this example, includes voltage comparator and ramp clock controller circuit 68, which receives power supply voltage $V_M$ and also a reference voltage VREG against which power supply voltage $V_M$ is compared or measured. Reference voltage VREG may be generated by a bandgap reference circuit, a voltage regulator, or another conventional circuit for generating a reference voltage that is substantially independent of power supply voltage $V_M$. According to the preferred embodiment of the invention, voltage comparator and ramp clock controller circuit 68 includes the appropriate circuitry for comparing power supply voltage $V_M$ to reference voltage VREG, and for generating the appropriate high and low voltage limits signals on lines VH, VL to level detector 66 in response to this comparison. It is contemplated that those skilled in the art having reference to this specification will be readily able to derive the appropriate detailed circuitry for voltage comparator and ramp clock controller circuit 68.

In operation, therefore, an increase in power supply voltage $V_M$ will cause voltage comparator and ramp clock controller circuit 68 to increase the high and low voltage limits used by level detector 66, by issuing the appropriate signals on lines VH, VL, in the manner described above relative to FIG. 5. Conversely, a decrease in power supply voltage $V_M$ will cause voltage comparator and ramp clock controller circuit 68 to decrease the high and low voltage limits used by level detector 66, by issuing the appropriate signals on lines VH, VL. In each case, the peak voltage $V_{peak}$ of ramp clock signal RMP is modulated according to the level of power supply voltage $V_M$, resulting in a change in the duty cycle of the output PWM signal as described above. This change in the duty cycle will compensate for the variations in open-loop gain due to the variations in power supply voltage $V_M$.

According to this preferred embodiment of the invention, the frequency of ramp clock signal RMP can also be controlled in response to variations in power supply voltage $V_M$. As shown in FIG. 6, voltage comparator and ramp clock controller circuit 68 also has an output connected to frequency control circuit 65. Voltage comparator and ramp clock controller circuit 68 thus can issue a control signal to frequency control circuit 65 in response to its comparison of power supply voltage $V_M$ to reference voltage VREG. Frequency control circuit 65 can therefore adjust its bias or control signals applied to current sources 62H, 62L in response to the signal issued by voltage comparator and ramp clock controller circuit 68. As described above, if power supply voltage $V_M$ increases, such that voltage comparator and ramp clock controller circuit 68 increases the peak voltage $V_{peak}$ in order to decrease the PWM duty cycle, voltage comparator and ramp clock controller circuit 68 can also issue a control signal to frequency control circuit 65 so that the charging and discharging currents sourced by current sources 62H, 62L also increase to maintain the frequency of ramp clock signal RMP constant. Conversely, a lower power supply voltage $V_M$ can cause voltage comparator and ramp clock controller circuit 68 to issue a signal to frequency control circuit 65 to reduce the current through current sources 62H, 62L, maintaining constant frequency in ramp clock signal RMP consistent with the lower peak voltages $V_{peak}$. As mentioned above, however, this control of the frequency of ramp clock signal RMP is optional. In addition, the frequency can be adjusted to only partially compensate for the changes in peak voltage, if such partial control is desired.

According to the preferred embodiment of the invention, therefore, variations in the open-loop gain of a pulse-width-modulated signal that are due to variations in power supply voltage are compensated by a change in the limits of the ramp clock signal. Additionally, the frequency of the ramp clock signal can be maintained constant, or partially adjusted if desired. In the context of a voice coil motor for a disk drive, this compensation of the open-loop gain variations provides improved accuracy in the positioning of a data transducer, or read-write head. This improved accuracy is particularly evident in transitions between drive modes in dual-mode voice coil motor controllers, and in those disk drive systems that utilize mechanical positioning control of the data transducer and positioning arm.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A pulse-width-modulation driver circuit, comprising:
   a first driver pair comprising first and second transistors having conduction paths connected in series between a power supply voltage and a ground voltage, each of the first and second transistors having a control terminal;
   pulse-width-modulation circuitry, for generating a first pulse-width-modulated signal responsive to a comparison of an error signal with a ramp clock signal having variable high and low limits;
   a first pulse-width-modulation driver, having an input coupled to receive the first pulse-width modulated signal and having outputs coupled to the control terminals of the first and second transistors; and
   a ramp clock generator, for generating the ramp clock signal that varies periodically between the high limit and the low limit, the ramp clock generator comprising circuitry for changing the high and low limits responsive to variations in the power supply voltage.

2. The circuit of claim 1, wherein the pulse-width-modulation circuitry is also for generating a second pulse-width-modulated signal responsive to a comparison of the error signal with the ramp clock signal;

further comprising:
a second driver pair comprising third and fourth transistors having conduction paths connected in series between the power supply voltage and a ground voltage, each of the third and fourth transistors having a control terminal; and
a second pulse-width-modulation driver, having an input coupled to receive the second pulse-width-modulated signal, and having outputs coupled to the control terminals of the third and fourth transistors.

3. The circuit of claim 2, further comprising:
a load, connected between a first node at the connection between the conduction paths of the first and second transistors, and a second node at the connection between the conduction paths of the third and fourth transistors.

4. A pulse-width-modulation driver circuit, comprising:
a first driver pair comprising first and second transistors having conduction paths connected in series between a power supply voltage and a ground voltage, each of the first and second transistors having a control terminal;
pulse-width-modulation circuitry, for generating a first pulse-width-modulated signal responsive to a comparison of an error signal with a ramp clock signal;
a first pulse-width-modulation driver, having an input coupled to receive the first pulse-width modulated signal and having outputs coupled to the control terminals of the first and second transistors;
a ramp clock generator, for generating the ramp clock signal that varies periodically between the high limit and the low limit, the ramp clock generator comprising circuitry for changing the high and low limits responsive to variations in the power supply voltage; and
circuitry for changing the slope of the ramp clock signal responsive to variations in the power supply voltage.

5. A pulse-width-modulation driver circuit, comprising:
a first driver pair comprising first and second transistors having conduction paths connected in series between a power supply voltage and a ground voltage, each of the first and second transistors having a control terminal;
pulse-width-modulation circuitry, for generating a first pulse-width-modulated signal responsive to a comparison of an error signal with a ramp clock signal;
a first pulse-width-modulation driver, having an input coupled to receive the first pulse-width modulated signal and having outputs coupled to the control terminals of the first and second transistors; and
a ramp clock generator, for generating the ramp clock signal that varies periodically between the high limit and the low limit, the ramp clock generator comprising circuitry for changing the high and low limits responsive to variations in the power supply voltage,
wherein the ramp clock generator comprises:
a timing capacitor;
a charging circuit, for periodically charging the timing capacitor;
a discharging circuit, for periodically discharging the timing capacitor;
a level detector, for detecting a voltage at the timing capacitor, for controlling the charging circuit to charge the timing capacitor responsive to the detected voltage reaching the low limit, and for controlling the discharging circuit to discharge the timing capacitor responsive to the detected voltage reaching the high limit; and
control circuitry, for measuring the power supply voltage and for communicating the high and low limits to the level detector responsive to the measured power supply voltage.

6. The circuit of claim 5, wherein the charging circuit comprises a first current source, for conducting a charge current to the timing capacitor responsive to a first control signal;
wherein the discharging circuit comprises a second current source, for conducting a discharge current to the timing capacitor responsive to a second control signal;
and further comprising:
frequency control circuitry, for applying the first and second control signals to the first and second current sources to control the charge and discharge currents responsive to the measured power supply voltage.

7. A method of controlling a pulse-width-modulated drive circuit, comprising:
generating a ramp clock signal that varies periodically between a high limit and a low limit;
comparing an error signal to the ramp clock signal;
generating a first pulse-width-modulated signal at a duty cycle responsive to the comparing of the error signal to the ramp clock signal having variable high and low limits;
driving control terminals of a first pair of driver transistors responsive to the first pulse-width-modulated signal, the first pair of driver transistors having conduction paths connected in series between a power supply voltage and a reference voltage;
responsive to the power supply voltage being higher than a nominal value, reducing the duty cycle of the first pulse-width-modulated signal; and
responsive to the power supply voltage being lower than the nominal value, increasing the duty cycle of the first pulse-width-modulated signal.

8. A method of controlling a pulse-width-modulated drive circuit, comprising:
generating a ramp clock signal that varies periodically between a high limit and a low limit;
comparing an error signal to the ramp clock signal;
generating a first pulse-width-modulated signal at a duty cycle responsive to the comparing of the error signal to the ramp clock signal;
driving control terminals of a first pair of driver transistors responsive to the first pulse-width-modulated signal, the first pair of driver transistors having conduction paths connected in series between a power supply voltage and a reference voltage;
responsive to the power supply voltage being higher than a nominal value, reducing the duty cycle of the first pulse-width-modulated signal; and
responsive to the power supply voltage being lower than the nominal value, increasing the duty cycle of the first pulse-width-modulated signal,
wherein the reducing step comprises:
increasing the high limit; and
decreasing the low limit.

9. The method of claim 8, wherein the increasing step comprises:
decreasing the high limit; and
increasing the low limit.

10. The method of claim 9, further comprising:
responsive to the power supply voltage being higher than the nominal value, increasing the slope of the ramp clock signal between the low and high limits; and
responsive to the power supply voltage being lower than the nominal value, decreasing the slope of the ramp clock signal between the low and high limits.

11. The method of claim 9, wherein the step of generating the ramp clock signal comprises:
charging a timing capacitor with a charge current;
responsive to a voltage at the timing capacitor reaching the high limit, discharging the timing capacitor with a discharge current; and
responsive to the voltage at the timing capacitor reaching the low limit, repeating the charging step.

12. The method of claim 11, further comprising:
responsive to the power supply voltage being higher than the nominal value, increasing the charge and discharge currents; and
responsive to the power supply voltage being lower than the nominal value, decreasing the charge and discharge currents.

13. A disk drive system, comprising:
a magnetic disk;
a positioning arm extended over the magnetic disk;
a data transducer mounted at a distal end of the positioning arm;
a voice coil motor coupled to a proximal end of the positioning arm, for pivoting the positioning arm;
a first driver pair comprising first and second transistors having conduction paths connected in series between a power supply voltage and a ground voltage, the voice coil motor coupled to a node at the connection between the conduction paths of the first and second transistors, and each of the first and second transistors having a control terminal;
pulse-width-modulation circuitry, for generating a first pulse-width-modulated signal responsive to a comparison of an error signal with a ramp clock signal having variable high and low limits;
a first pulse-width-modulation driver, having an input coupled to receive the first pulse-width modulated signal and having outputs coupled to the control terminals of the first and second transistors; and
a ramp clock generator, for generating a ramp clock signal that varies periodically between the high limit and the low limit, the ramp clock generator comprising circuitry for changing the high and low limits responsive to variations in the power supply voltage.

14. The system of claim 13, wherein the pulse-width-modulation circuitry is also for generating a second pulse-width-modulated signal responsive to a comparison of the error signal with the ramp clock signal;
further comprising:
a second driver pair comprising third and fourth transistors having conduction paths connected in series between the power supply voltage and a ground voltage, the voice coil motor coupled to a node at the connection between the conduction paths of the third and fourth transistors, each of the third and fourth transistors having a control terminal; and
a second pulse-width-modulation driver, having an input coupled to receive the second pulse-width-modulated signal, and having outputs coupled to the control terminals of the third and fourth transistors.

15. A disk drive system, comprising:
a magnetic disk;
a positioning arm extended over the magnetic disk;
a data transducer mounted at a distal end of the positioning arm;
a voice coil motor coupled to a proximal end of the positioning arm, for pivoting the positioning arm;
a first driver pair comprising first and second transistors having conduction paths connected in series between a power supply voltage and a ground voltage, the voice coil motor coupled to a node at the connection between the conduction paths of the first and second transistors, and each of the first and second transistors having a control terminal;
pulse-width-modulation circuitry, for generating a first pulse-width-modulated signal responsive to a comparison of an error signal with a ramp clock signal;
a first pulse-width-modulation driver, having an input coupled to receive the first pulse-width modulated signal and having outputs coupled to the control terminals of the first and second transistors; and
a ramp clock generator, for generating a ramp clock signal that varies periodically between a high limit and a low limit, the ramp clock generator comprising circuitry for changing the high and low limits responsive to variations in the power supply voltage,
wherein the ramp clock generator further comprises:
circuitry for changing the slope of the ramp clock signal responsive to variations in the power supply voltage.

16. A disk drive system, comprising:
a magnetic disk;
a positioning arm extended over the magnetic disk;
a data transducer mounted at a distal end of the positioning arm;
a voice coil motor coupled to a proximal end of the positioning arm, for pivoting the positioning arm;
a first driver pair comprising first and second transistors having conduction paths connected in series between a power supply voltage and a ground voltage, the voice coil motor coupled to a node at the connection between the conduction paths of the first and second transistors, and each of the first and second transistors having a control terminal;
pulse-width-modulation circuitry, for generating a first pulse-width-modulated signal responsive to a comparison of an error signal with a ramp clock signal;
a first pulse-width-modulation driver, having an input coupled to receive the first pulse-width modulated signal and having outputs coupled to the control terminals of the first and second transistors; and
a ramp clock generator, for generating a ramp clock signal that varies periodically between a high limit and a low limit, the ramp clock generator comprising circuitry for changing the high and low limits responsive to variations in the power supply voltage,
wherein the ramp clock generator comprises:
a timing capacitor;
a charging circuit, for periodically charging the timing capacitor;
a discharging circuit, for periodically discharging the timing capacitor;
a level detector, for detecting a voltage at the timing capacitor, for controlling the charging circuit to charge the timing capacitor responsive to the detected voltage reaching the low limit, and for controlling the discharg ing circuit to discharge the timing capacitor responsive to the detected voltage reaching the high limit; and control circuitry, for measuring the power supply voltage and for communicating the high and low limits to the level detector responsive to the measured power supply voltage.

17. The system of claim 16, wherein the charging circuit comprises a first current source, for conducting a charge current to the timing capacitor responsive to a first control signal;

wherein the discharging circuit comprises a second current source, for conducting a discharge current to the timing capacitor responsive to a second control signal;

and further comprising:

frequency control circuitry, for applying the first and second control signals to the first and second current sources to control the charge and discharge currents responsive to the measured power supply voltage.

* * * * *